Oct. 27, 1936.　　　J. S. BURGESS　　　2,058,853
WHEEL
Filed June 6, 1934　　　3 Sheets-Sheet 1
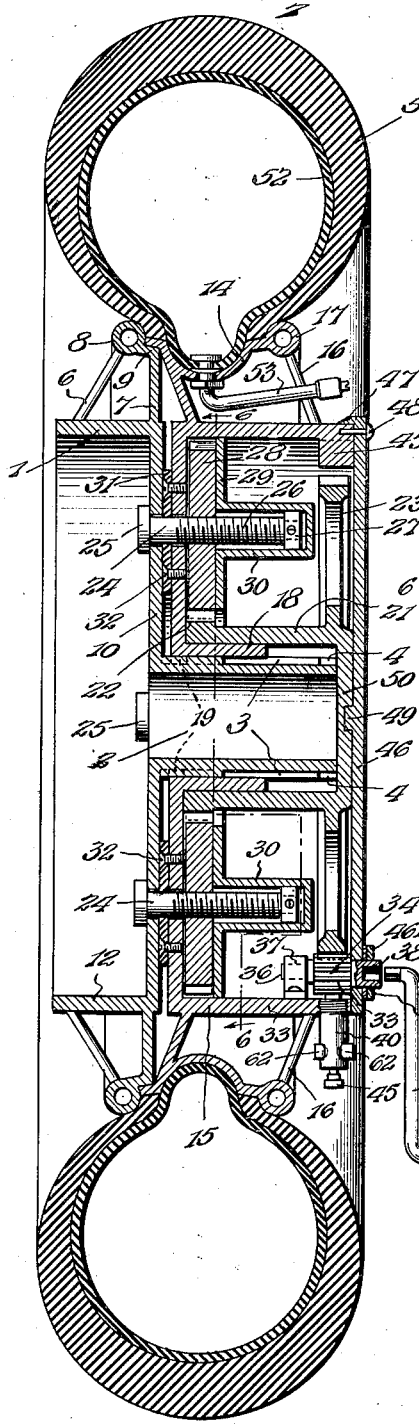
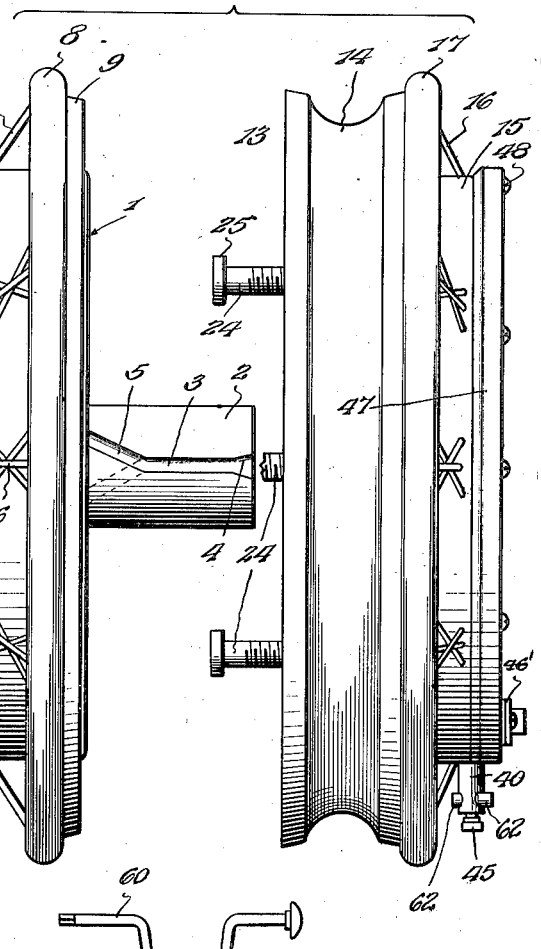
Inventor
J. S. Burgess.
By Lacey & Lacey, Attorneys Oct. 27, 1936.   J. S. BURGESS   2,058,853
WHEEL
Filed June 6, 1934   3 Sheets-Sheet 2
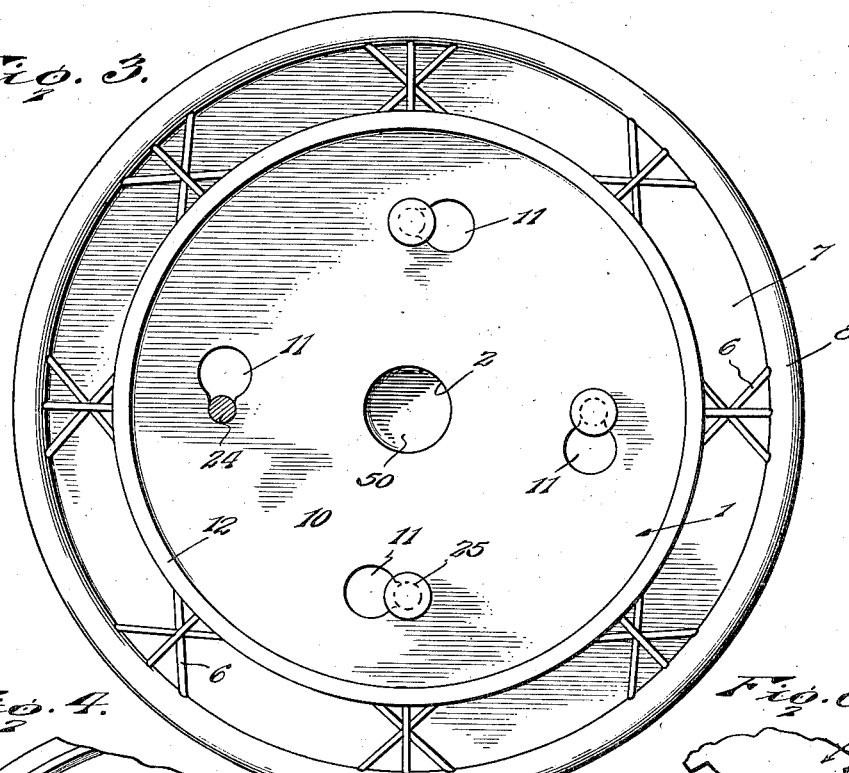
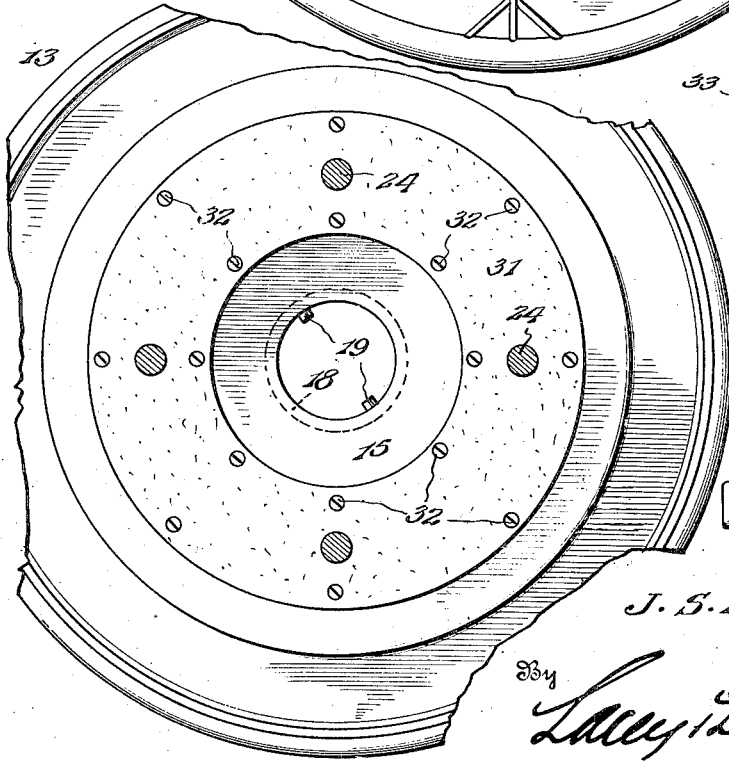
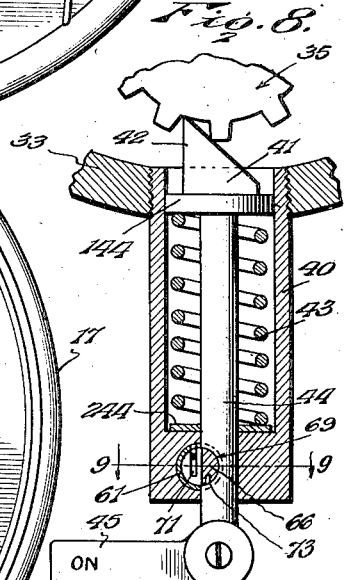

Oct. 27, 1936.    J. S. BURGESS    2,058,853
WHEEL
Filed June 6, 1934    3 Sheets-Sheet 3
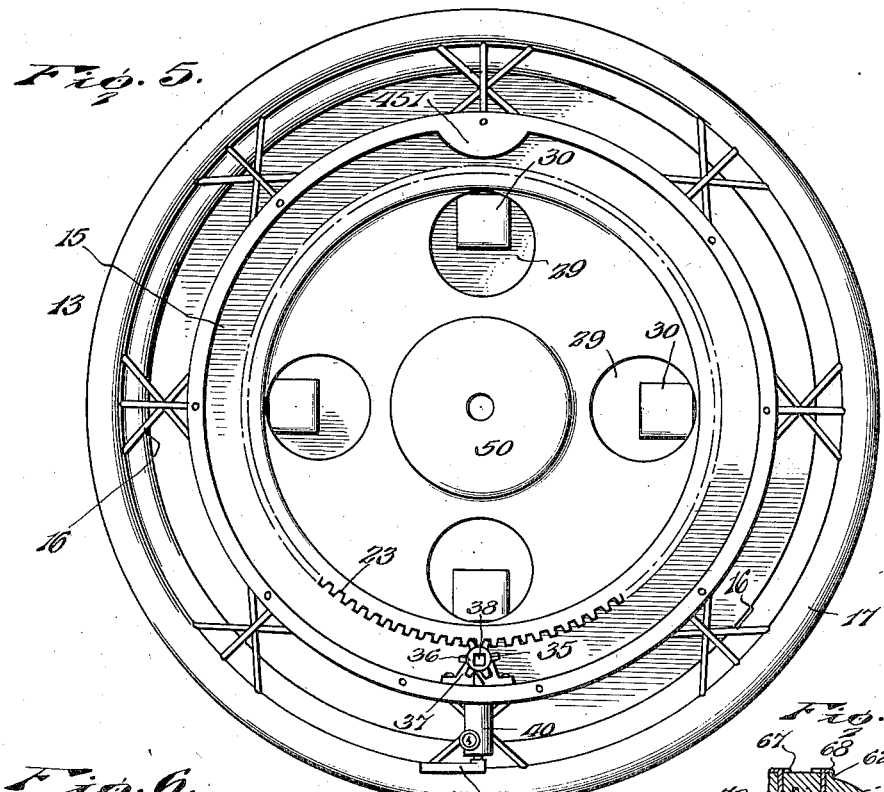
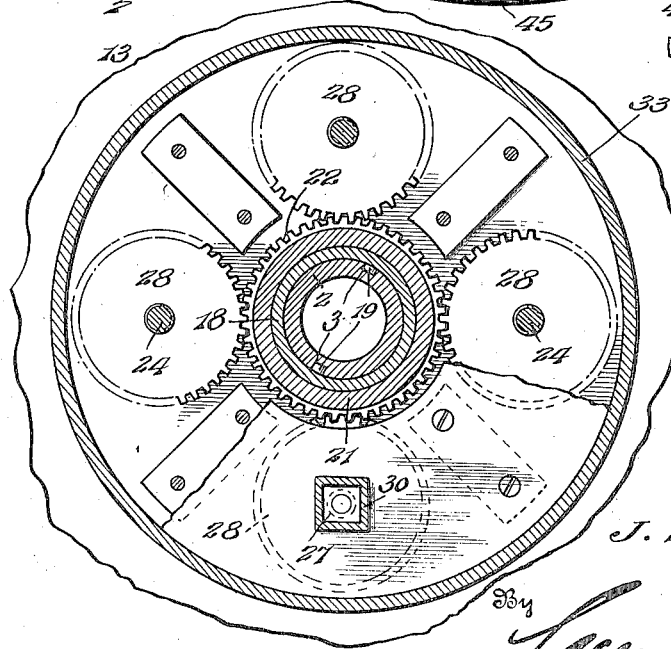
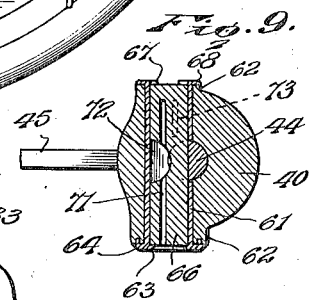
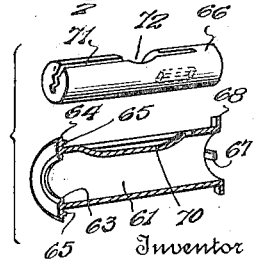
Inventor
J. S. Burgess.
By Lacey & Lacey, Attorneys Patented Oct. 27, 1936

2,058,853

UNITED STATES PATENT OFFICE 2,058,853

WHEEL

Joseph S. Burgess, Sadieville, Ky.

Application June 6, 1934, Serial No. 729,316

7 Claims. (Cl. 301—6)

This invention relates to an improved vehicle wheel and seeks, among other objects, to provide a wheel which may be removed from the drum upon which it is mounted very quickly and with the utmost facility so that repairs to a tire carried by the wheel may be made much more rapidly than at present.

Another object of the invention is to provide a wheel which, when mounted on the axle and hub associated therewith, will be secure and will not wobble nor be accidentally released.

A further object of the invention is to provide a wheel wherein locking means are employed for securing the wheel in place in such a manner that accidental displacement will be prevented.

A further object of the invention is to provide a wheel which is relatively simple in construction and which may be adapted for use on motor cars of all types.

A still further object of the invention is to provide a wheel wherein the usual locking bolts and nuts are dispensed with so that a quick tire change, without danger of losing parts, may be effected.

Another object of the invention is to provide a wheel which, while being well balanced, is of heavier construction than the ordinary wheel so that the shock-absorber on the vehicle on which it is mounted will be permitted to exert their full shock-absorbing qualities.

And a still further object of the invention is to provide a wheel which may be removed from its associated drum with but a single operation.

Other and incidental objects of the invention, not specifically mentioned in the foregoing, will be apparent during the course of the following description.

Referring now to the drawings forming a part hereof,

Figure 1 is a transverse vertical sectional view of my improved wheel in mounted position on the drum.

Figure 2 is a plan view showing the wheel and drum as they would appear before being placed in coacting relation, the tire being omitted.

Figure 3 is a rear elevation view of the wheel.

Figure 4 is a view of the wheel showing the drum removed.

Figure 5 is a front view of the cover removed and showing the main gear employed for locking the bolts.

Figure 6 is a front view, with parts in section, on the line 6—6 of Fig. 1, showing the gears employed on the bolts which are adapted for rotation by the main gear for effecting the locking operation.

Figure 7 is a detail showing an alternate form of operating crank.

Figure 8 is a longitudinal section through the locking mechanism.

Figure 9 is a section on the line 9—9 of Figure 8.

Figure 10 is a detail showing the locking bolt and its case.

Referring now more particularly to the accompanying drawings, the numeral 1 indicates a circular drum which is preferably pressed from steel and is formed axially thereof with a hollow hub 2 which is adapted to receive the outer end portion of an axle therein. The hub is provided at opposite sides thereof with guide slots or grooves 3 which are provided with flared mouths 4 and are directed obliquely near the side of the drum, as indicated at 5, the slots terminating in relatively close spaced relation to the drum. Formed on the drum are radially extending spokes 6 which serve to brace a circular rim 7 which is formed on the hub at its forward circumferential edge. The rim section is provided with a bead 8 and a shoulder 9. Formed in the end wall 10 of the drum in circumferential spaced relation are bayonet openings 11. Each of these openings is located substantially medially of the radius of the drum. The circular wall 12 of the drum is adapted for engagement by the usual brake mechanism employed on motor vehicles.

Associated with the drum and rim portion is a wheel section which is indicated in general by the numeral 13. The wheel section comprises a drop center rim 14, which is connected with a hub housing 15 by means of spokes 16. The outer edge of the rim is provided with a bead 17 and the inner edge thereof is adapted to fit snugly over the shoulder 9. It will be understood that, as seen in Figure 1 of the drawings, the tire is effectually clamped between the beads 8 and 17 when the device is completely assembled.

As best seen in Figure 1 of the drawings, the hub housing is provided centrally with a hub flange 18 which is intended to encircle the hub 2 and terminates, when the device is assembled, at a point substantially half the length of the hub. Formed on the housing at the inner end of the hub flange 18 are guide studs 19, seen more clearly in Figure 4 of the drawings, which enter and cooperate with the guide slots 3 so that when the housing is being placed upon the drum, the bolts, to be hereinafter described, will be effectually guided into the openings 11 in the wall 10 of the drum. Rotatable upon the hub flange 18, within the housing, is a double gear having a central hollow sleeve 21 and teeth 22 at the base thereof. The gear is provided with an outer toothed section 23 which extends throughout the major portion of the diameter of the housing. Mounted within the housing are locking bolts 24, preferably four in number. These locking bolts are provided with circular heads 25 and are threaded throughout their length, as shown at 26. Nuts 27 are secured on the inner ends of the bolts by set screws or other suitable means. As best seen in Figures 1 and 3 of the drawings, the bolts are adapted to be alined with the lateral portions of the bayonet openings 11 in the drum 1. Rotatable on each of the bolts is a gear 28 meshing with the teeth 22 of the double gear. The gears 28 are rotatable against the inner wall of the housing and are held in position thereagainst by means of locking covers 29 which are provided with sleeves 30, which sleeves are square in cross section to accommodate the squared nuts 27 therein. The locking covers are, of course, anchored against movement so that rotation of the gears 28 will cause longitudinal shifting movement of the bolts 24, in view of the fact that said gears are threaded upon the threaded portions 26 of said bolts.

Secured to the inner face of the hub housing 15 and adapted for disposal in the path of the bayonet openings 11 and receiving the bolts 24 therethrough, is a circular gasket or washer 31 which is adapted to provide a tight liquid seal between the two sections of the device so that grease, which is to be packed within the hub housing, will be prevented from escaping into the brake drum and interfering with the proper operation of the brakes. The circular gasket or washer is secured to the face of the hub housing by means of screws 32.

Mounted on the circular wall 33 of the hub housing, at a point on its circumference and near its outer edge, is gear rotating mechanism which is indicated in general by the numeral 34. The gear rotating mechanism, as best seen in Figures 1 and 5 of the drawings, comprises a spur gear 35 which meshes with the teeth of the outer section 23 of the double gear. The gear 35 is secured on a shaft 36 which is journaled in a bearing 37 mounted on the circular wall 33. The shaft is adapted to project outwardly past the circular wall 33 and is formed with a squared socket 38 which is adapted to removably receive a crank, such as indicated at 39. Mounted on the circular wall 33 of the hub housing in a diametric plane, is a lock housing 40 and carried in the lock housing is a plunger 41 having a tooth 42 thereon which is adapted to engage between adjacent teeth on the gear 35 for locking said gear against rotation. The plunger is normally urged against the gear by means of a spring 43 disposed within the housing around the stem 44 of the plunger between a flange 144 on the stem and a gasket 244 at the outer end of the housing, and the outer end of the stem is provided with a handle 45 for manual manipulation. When it is desired to rotate the gear, the handle is shifted away from the rim and rotated freeing the tooth 42 of the plunger 41 from between the adjacent teeth of the gear 35. As best seen in Figures 1 and 5 of the drawings, a portion of the wall 33 of the hub housing is thickened, as shown at 451, to provide additional weight to counterbalance the weight of the gear rotating mechanism, so that the wheel will be evenly balanced.

Closing the outer end of the hub housing is a closure plate 46 which is provided with an inwardly directed overhanging flange 47 adapted to overlie the margin of the housing and prevent entry of moisture therein. The closure plate is secured to the housing by means of screws 48. Formed axially of the closure plate is a centering stud 49 which is adapted to be received in an axial socket formed in the closed end 50 of the double gear so that wobbling of the same will be prevented. The closure plate 46 receives the outer end of the shaft 36 therethrough and provides journaling means therefor, a bushing 461 being employed for protecting and journaling the outer end of the shaft 36 of the gear rotating mechanism.

In Figure 1 of the drawings, the device is shown in completely assembled position with a tire 51 on the rim 14 and clamped thereon by and between the beads 8 and 17. The tube 52 within the tire is provided with a valve stem 53 which is necessarily elongated and bent to a slightly acute angle to project outwardly so that access may be readily had thereto when it is desired to introduce air into the tube. When it is desired to remove the tire from the rim, the crank 39 is first inserted into the socket 38 and said crank is rotated, after shifting and rotating the handle 45 and freeing the tooth of the head 42 from the teeth of the gear 35, for rotating the double gear, and, in turn, rotating the gears 28 which are screwed upon the threaded portions 26 of the bolts 24. As said gears are locked against longitudinal movement, the bolts will be shifted inwardly for freeing the heads thereof from the bayonet openings 11 in the forward wall 10 of the drum. It will be seen that the nuts 27, which are slidable in the sleeves 30, provide guiding means which serve to guide the bolts in their longitudinal travel. It will, therefore, be understood that the wheel section may be readily removed from the drum and the tire removed therefrom with the utmost facility. When the tire has been repaired or changed it is only necessary to reverse the operation above outlined, whereupon the wheel will be firmly and effectually mounted upon the drum. Attention is directed to the fact that the entire removal of the wheel section can be effected by a single operation. If desired, a crank of the type in Fig. 7 and identified by the numeral 60 may be substituted from the crank 39.

To guard against removal of the wheel by unauthorized persons, a lock is provided at the outer end of the housing 40. As shown in Fig. 8, the end or the housing is made thick enough to receive and enclose a tube 61, bosses 62 being formed on the housing to enclose and support the ends of the tube. A passage is, of course, formed through the housing to accommodate the tube and, as shown in Figs. 8 and 9, said passage is arranged at a right angle to the bore in which the plunger stem 44 slides and intersects said bore. The tube is provided at one end with an internal flange 63 and an external flange 64, the latter being secured to the housing 40 to retain the tube therein and being provided with spaced spurs 65 to seat in recesses in the housing and thereby insure the proper placing of the tube. The flange 63 serves to retain a bolt 66 within the tube, inwardly directed lugs 67, at the opposite end of the tube, cooperating with the flange to prevent endwise movement of the bolt. Outwardly directed lugs 68, at the last-mentioned end of the tube, bear against the housing to resist endwise movement of the tube. It will be understood that the tube is of sheet metal and the lugs may be formed by slitting the end of the tube to produce tongues and then bending the alternate tongues in opposite directions. The stem 44 is provided with a notch 69 in one side to be engaged by the bolt 66 so that the plunger cannot be withdrawn to permit actuation of the pinion 35 until and unless it is free of the bolt. The tube is formed with a notch in one side to accommodate the plunger stem 44 and its opposite side is longitudinally slitted and equipped with a spring tongue 70. The bolt has a key-receiving longitudinal channel 71 intercepted midway its ends by a notch 72 to accommodate the stem 44 when the latter is released. Diametrically spaced from the channel 71 a short groove 73 is formed in the surface of the bolt.

The plunger is shown locked in Figs. 8 and 9 in which figures a portion of the bolt is seen seated in the notch in the plunger, the spring tongue 70 engaging in the channel 71. When the key is inserted, it will ride on the tongue and push it from the channel so that the bolt may then turn. The key and bolt are then turned through one-half a revolution so that the notch 72 will be presented to the plunger and the spring 70 will seat in the groove 73. When the plunger is to be again locked in engagement with the pinion 35, the key and the bolt are turned to the locked position thereby restoring the relation shown in Figs. 8 and 9. The spring tongue 70 is preferably beveled on its side edges in order that, while it will effectually hold the bolt in the position to which it has been turned, release of the tongue from the groove 73 will be easily effected when turning pressure is applied to the bolt through the key.

I claim:

1. A device of the class described including a drum having a rim portion, a hub housing removably connected with the rim portion, said rim portion being provided with an opening, bolts carried within the hub housing and extending within the drum, a gear screwed upon each bolt, means limiting longitudinal movement of the gears, a double gear in the housing having teeth at its base meshing with the first-mentioned gears, said double gear having an outer section, and means carried on the hub housing and engageable with the outer section, said means being rotatable for rotating the outer section, the teeth of the base of said double gear and said first-mentioned gears whereby the bolts will be removably locked in the drum.

2. A device of the class described including a drum having a rim portion, a wheel section normally associated with the drum and rim portion, said wheel section including a drop center rim and a hub housing, bolts carried within each hub housing, a gear carried on the bolt, a double gear rotatable axially in the hub housing and having teeth at the base thereof engageable with the teeth of the first-mentioned gear, said double gear having an outer section, a locking cover overhanging the first-mentioned gear and provided with sleeves, said locking cover limiting said first-mentioned gears against longitudinal movement and said sleeves providing a guide for the bolts, and a spur gear carried on the hub housing and engageable with the outer section of the double gear, said spur gear being rotatable for rotating said double gear and said first-mentioned gears for locking ends of the bolts on the drum whereby the drum and rim portion and wheel section will be locked as a unit.

3. A device of the class described including a drum having a forward wall provided with a hub at its center and in radial spaced relation to the hub being formed with keyhole openings extending circumferentially of the wall, said hub being formed with guide slots extending longitudinally of the hub from the outer end thereof and terminating in diagonally extending inner end portions, a wheel section normally associated with the drum axially of the hub and having a hub housing provided with a flange and studs engageable within the guide slots, bolts carried within the hub housing and projecting from the flange of the hub housing for engaging through the keyhole openings, means within the hub housing for shifting the wheel section longitudinally upon the drum for engaging said bolts through the keyhole openings of the drum and moving the bolts into the restricted portions of the keyhole openings whereby said drum and wheel section will be locked as a unit, and means engageable with said first mentioned means for locking said first mentioned means against displacement.

4. A device of the class described including a drum having a wall provided with bayonet openings, a wheel section including a hub housing having a circular wall, gears mounted in the hub housing against the inner wall thereof, bolts screwed through the gears and having heads, said bolts being adapted to pass through the bayonet openings, locking covers carried within the hub housing and having sleeves surrounding the bolts, a double gear mounted axially of the hub housing and having teeth at the base thereof engageable with the teeth of the gears, said double gear having an outer section, a spur gear mounted on the circular wall of the hub housing and engageable with the teeth on the outer section of the double gear, a shaft mounting said spur gear, a bearing journaling the shaft, a socket formed in the shaft at one end, and a crank removably engageable with the socket, the rotation of said spur gear by the crank being adapted for rotating the double gear and all of the first mentioned gears whereby the heads of the bolts will be retracted within the drum for clamping the wheel section and drum as a unit, all of said gears being rotatable in an opposite direction for releasing the bolts and permitting separation of the wheel section and drum.

5. A device of the class described including a drum, having a rim portion, a hub housing mounted axially of the drum, means removably connecting the drum and hub housing, means interposed between said drum and hub housing for preventing leakage of liquid from said hub housing into said drum, a cover closing said hub housing, and means extending through the cover and engageable for controlling said connecting means whereby rapid mounting and dismounting of the drum may be effected.

6. A device of the class described including a drum, a hub housing associated therewith and having a circular wall, means within the hub housing adapted for connecting the hub housing with the drum, said means including a spur gear, a locking housing mounted on the circular wall, a plunger carried in the housing and having a tooth engageable with the spur gear for locking said gear against rotation, a spring carried within the housing and normally urging the plunger into engagement with the spur gear, and a handle carried by the plunger and adapted for retracting the plunger and permitting rotation of the spur gear.

7. A device of the class described including a drum having a hub provided with guide slots formed with oblique portions and flared mouths, a wheel section associated with the drum and having a hub housing provided with a flange normally surrounding the hub and formed with studs engageable within the guide slots, gears carried within the hub housing, locking covers limiting longitudinal movement of the gears, bolts screwed through the gears and shiftable longitudinally by rotation of said gears, said bolts having heads and said locking covers being provided with sleeves for guiding the bolts, a bushing washer carried by the hub housing and adapted for preventing escape of grease from said housing along the bolts into the drum, a double gear rotatable within the housing about the flange and having teeth at the base thereof engageable with the gears, said double gear having an outer section, a spur gear carried within the hub housing at its periphery and engageable with the outer section for rotating all of said gears whereby shifting of the bolts for locking the heads thereof within the drum for connecting said drum and said wheel section may be effected, means carried by the hub housing and retractably engageable with the spur gear for locking the gear against accidental rotation, and a cover closing the hub housing at its outer end.

JOSEPH S. BURGESS.